(No Model.)
I. SYLVESTER.
CULTIVATOR.
No. 413,836. Patented Oct. 29, 1889.
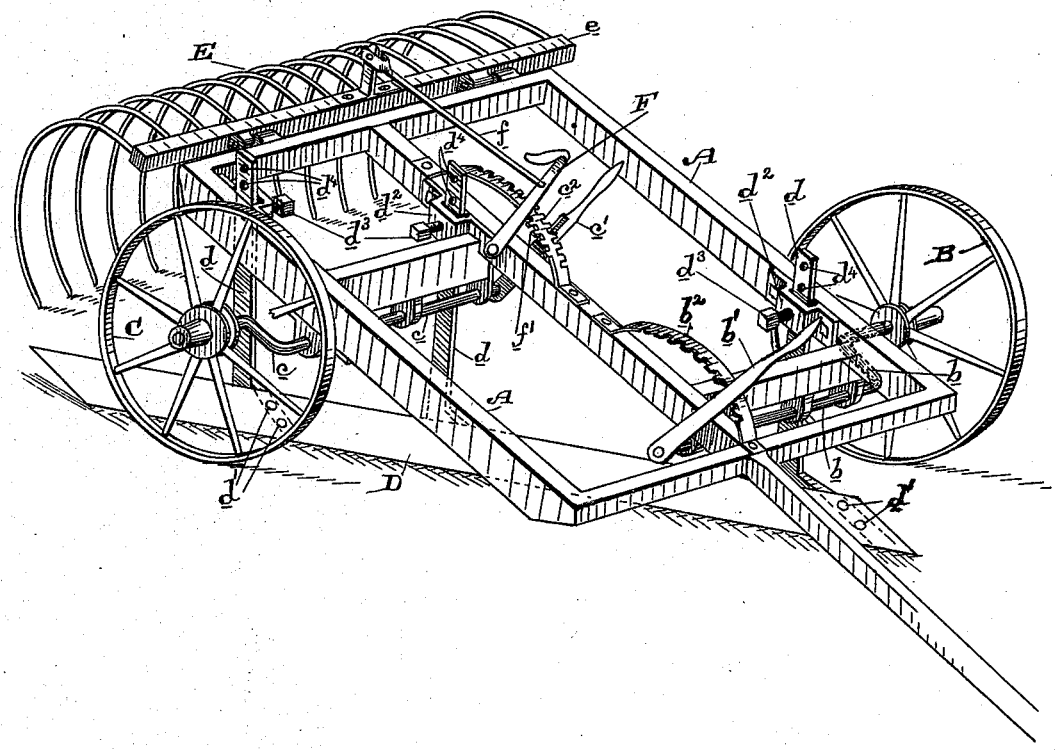
Witnesses,
Arrise
H. E. Lee.
Inventor,
Isaac Sylvester
By Dewey & Co.
Attys

UNITED STATES PATENT OFFICE.

ISAAC SYLVESTER, OF COLUSA, CALIFORNIA, ASSIGNOR OF ONE-HALF TO R. A. GRAY, OF SAME PLACE.

CULTIVATOR.

SPECIFICATION forming part of Letters Patent No. 413,836, dated October 29, 1889.

Application filed June 26, 1889. Serial No. 315,657. (No model.)

*To all whom it may concern:*

Be it known that I, ISAAC SYLVESTER, of Colusa, Colusa county, State of California, have invented an Improvement in Cultivators; and I hereby declare the following to be a full, clear, and exact description of the same.

My invention relates to the class of agricultural implements, and especially to that class of cultivators which are adapted for cutting weeds, and commonly known as "weed-cutters;" and my invention consists in a frame having a wheel on each side mounted upon an independent crank-axle, whereby the frame and the cutting-blade which it carries may be raised and lowered, a cutting-blade secured adjustably under the frame and carried by said frame at an angle extending from one of the forward corners to the rear corner diagonally opposite, and a rake attachment upon the rear of the frame, all of which I shall hereinafter more fully describe.

The object of my invention is to provide a simple and effective cultivator of the weed-cutting class.

Referring to the accompanying drawing for a more complete explanation of my invention, the figure is a perspective view of my cultivator.

A is the frame of the machine, having a wheel B on one side near the front and a wheel C on the other side near the rear. These wheels are mounted upon independent crank-axles $b$ and $c$, which extend in suitable bearings to the center of the frame, and are provided with levers $b'$ and $c'$, which engage racks $b^2$ and $c^2$, whereby the position of the levers is regulated. By moving these levers the crank-axles of the wheels may be turned so as to raise and lower the frame, and by moving one or the other of these levers this adjustment may be regulated at will for each side of the frame.

D is the cutting-blade. This is a long strip of metal, and is carried by the frame at an angle, as shown, its forward end being about under the forward corner of the frame, and its rear end extending to the diagonally-opposite rear corner of the frame, so that a great length of blade is thus obtained, which entirely covers the working width of the machine. This blade is carried by standards $d$, to which it is bolted by bolts $d'$, so that it can be readily removed for sharpening or the substitution of another. The standards are mounted in strap-bearings $d^2$ on the frame above, and are secured therein by bolts $d^3$, passing through any of the vertical series of holes $d^4$ in the standards, so that the blade may be independently raised and lowered. The blade therefore has two adjustments— first, its primary adjustment just described, and, second, its adjustment by reason of the crank-axles of the wheels which carry the frame. This latter adjustment may be a complete one with regard to the entire length of the blade, raising or lowering it by the movement of both crank-axles; or by moving one or the other of the crank-axles one portion or another of the blade may be raised or lowered to conform to the character of the ground in which it is working.

E is a rake, the head $e$ of which is hinged to the back of the frame. This rake is operated by means of a lever F and connecting-link $f$, said lever having a rack $f'$ for regulating its position.

The operation of the machine is as follows: The cutting-blade is first adjusted to the proper position by setting its standards $d$ in their bearings according to the ground in which it is working. One end or the other of it is properly adjusted by adjusting the crank-axles of the wheels. The rake following not only serves the purpose of raking the cut weeds, but also loosens up the ground itself.

The machine is adjustable to rough and smooth ground, on account of the ease with which the blade can be raised and lowered. The blade arranged as shown operates thoroughly and satisfactorily and without danger of breaking. Its movement is free from jerks. Either the entire blade or one end of it can be raised or lowered, thus giving complete control of it.

The machine may be used in summer fallow land, missing or jumping nothing, but cutting with a steady smooth cut while in motion. The blade may be made of any size, and on smaller machines but a single rack may be used for controlling and holding the independent levers $b'$ $c'$, which operate the crank-axles. There is no side draft, this being regulated by the elevation of the blade at one end, according to the ground, and any tendency to side draft is overcome by the position of the rear wheel.

Having thus described my invention, what I claim as new, and desire to secure by Letters Patent, is—

1. In a cultivator, the frame and the independent axles carrying wheels, one of said wheels being near the front at one side and the other near the rear at the other side, in combination with the diagonally-arranged cutting-blade extending from one of the front corners to one of the rear corners of the machine and standards extending from said blade and adjustably secured to the frame, substantially as described.

2. In a cultivator, the frame, the independent wheels carrying it, one arranged near the front at one side and the other near the rear at the other side, the independent crank-axles on which said wheels are mounted, and the levers for operating them, in combination with the diagonally-arranged cutting-blade carried by the frame and extending from one of its front corners to one of its rear corners, substantially as described.

3. In a cultivator, the frame, the independent wheels, and the independent axles upon which said wheels are mounted, in combination with a diagonally-arranged cutting-blade carried by the frame and extending from one of its front corners to one of its rear corners, a rake attachment at the rear of the frame, and a lever for operating the same, substantially as described.

4. A cultivator consisting of the frame, the wheels carrying it, and the independent crank-axles and the levers for operating them, the diagonally-arranged cutting-blade, the adjustable standards connected with the blade and frame, and the swinging rake attachment at the rear of the frame, substantially as herein described.

In witness whereof I have hereunto set my hand.

ISAAC $\overset{\text{his}}{\times}$ SYLVESTER.
mark

Witnesses:
R. A. GRAY,
H. M. ALBERY.